United States Patent [19]

Momyer

[11] 4,001,043

[45] Jan. 4, 1977

[54] ANODE MODERATOR FOR REACTIVE METAL ELECTROCHEMICAL CELLS

[75] Inventor: William R. Momyer, Palo Alto, Calif.

[73] Assignee: Lockheed Missiles & Space Company, Inc., Sunnyvale, Calif.

[22] Filed: May 23, 1975

[21] Appl. No.: 580,303

[52] U.S. Cl. .............................. 429/206; 429/218
[51] Int. Cl.² ...................................... H01M 6/04
[58] Field of Search ............... 136/6 R, 6 F, 100 R, 136/83 R, 155, 154

[56] References Cited

UNITED STATES PATENTS

| | | | |
|---|---|---|---|
| 2,706,213 | 4/1955 | Lucas | 136/154 |
| 3,791,871 | 2/1974 | Rowley | 136/100 R |
| 3,825,445 | 7/1974 | MacCarthy | 136/154 |
| 3,833,420 | 9/1974 | Will | 136/6 R |
| 3,833,422 | 9/1974 | Will et al. | 136/6 F |

*Primary Examiner*—Donald L. Walton
*Attorney, Agent, or Firm*—Richard H. Bryer; Billy G. Corber

[57] ABSTRACT

In a reactive metal-water electrochemical cell, an alkaline electrolyte, containing soluble peroxide ions which improve the uniformity of reaction at the anode, reduces the anode's sensitivity to changes in the hydroxyl ion concentration of the electrolyte, reduces the anode's sensitivity to electrolyte flow rate and reduces the anode's sensitivity to temperature. The improved characteristics of the cell result from the ability of the peroxide ions to stabilize the anode and also to be reduced at a more electronegative potential than is required for the reduction of water. The soluble peroxide ion, $HO_2^-$, is formed when hydrogen peroxide, sodium peroxide and other soluble inorganic peroxide compounds are dissolved in the alkaline solution.

7 Claims, 3 Drawing Figures

ANODE MODERATOR FOR REACTIVE METAL ELECTROCHEMICAL CELLS

BACKGROUND OF THE INVENTION

This application describes and claims certain improvements in the basic electrochemical cell disclosed in U.S. Pat. No. 3,791,871 issued Feb. 12, 1974.

The basic mechanism of operation of the cell described in the aforementioned patent is incorporated by reference in this application. Briefly, the cell utilizes a reactive metal anode highly reactive with water and spaced from a cathode by an electrically insulating film formed on the anode in the presence of water. The anode and cathode are immersed in aqueous electrolyte. In the embodiment shown in the aforementioned patent, the anode is formed of an alkali metal such as sodium or lithium and, during operation of the cell, the electrolyte is a liquid solution in water of an alkali metal hydroxide. Alloys and compounds of the alkali metals and other reactive metals should be equally feasible for use as the anode, however, provided they are substantially as reactive with water as are sodium and lithium and further provided, in common with sodium and lithium, they form an insulating film in the presence of water. The electrolyte is preferably an alkali metal hydroxide of the alkali metal utilized as the anode since such hydroxide is naturally formed during operation of the cell and hence automatically regenerates the electrolyte during operation. However, other alkaline electrolytes can be used to initially start up the cell or even during operation of the cell provided they permit the required anode-cathode reactions. Illustratively, potassium and ammonia hydroxide and alkali metal halides are feasible. After start-up, these electrolytes will become replaced by the hydroxide of the anode metal unless subsequent additions of these electrolytes are made during operation of the cell.

Due to anode sensitivity, there are a number of limitations to the basic electrochemical cell. It is difficult to control the reactive metal-water parasitic reaction. This further reduces the energy density in the cell and results in additional heating. One of the best methods of suppressing the parasitic reaction is to operate the cell in high molarity electrolytes. However, power from the cell appreciably decreases in high molarity electrolytes and cell performance is quite sensitive to minute changes (~0.01M) in, for example, lithium hydroxide concentration. Large amounts of diluent water are therefore required to control molarity and replace the water consumed by the useful electrochemical reaction.

Performance of the cell also undesirably fluctuates with changes in electrolyte flow rates, with higher power densities being realized at high pumping speeds. Desirably, high power densities should be achieved at low pumping speeds in order to reduce the power requirements for the pump. Further, it is also desirable to have power remain constant over a broad range of flow rates so as to simplify multicell battery design.

Performance of the cell is also quite sensitive to temperature, and heat exchanger requirements for the cell are substantial due to the narrow temperature operating range for efficient reactive metal anode operation.

SUMMARY OF THE INVENTION

Briefly, in accordance with the invention, it has been discovered that efficiency of reactive metal-water cells is significantly improved by the use of alkaline electrolytes containing inorganic soluble ions which enhance efficiency of the reactive metal anode. More particularly, it has been found that peroxide ions reduce the anode's sensitivity to changes in hydroxyl ion concentration of the electrolyte, reduce the anode's sensitivity to changes in electrolyte flow rate, and improve the operating temperature characteristic of the cell. The peroxide ions are formed from soluble peroxide compounds such as hydrogen peroxide, sodium peroxide, sodium super oxide, lithium peroxide, potassium peroxide, potassium super oxide and the like.

The use of hydrogen peroxide as a cathode reactant in alkaline solutions to improve cell voltage is well known in prior art nonconsuming anode-fuel electrochemical cells. Background data on the use of hydrogen peroxide as a cathode reactant is given in "Electrochemical Processes in Fuel Cells" by Manfred Breiter, Springer Verlog, New York, New York 1969. The use of hydrogen peroxide as a cathode reactant to improve cell voltage in a reactive metal-water electrochemical cell would not appear feasible, however. Hydrogen peroxide is a strong oxidizing agent and reactive metal anodes, such as lithium, are strong reducing agents. The expected reaction upon mixing the two is the direct chemical combination to produce lithium hydroxide and the release of a large amount of heat such that the lithium anode becomes molten. The net result is that no useful energy would be derived. It has been found, however, that the hydrous oxide film on the reactive anode surface prevents the violent hydrogen peroxide-anode reaction and accordingly permits enhancement in cell voltage. In so unexpectedly permitting the peroxide to be utilized in conventional fashion as a cathode reactant, the improvement realized in voltage enhancement in a reactive metal-water cell is illustrated by the following reactions 1 through 6, where reactions 1 through 3 are illustrative of the basic lithium-water reaction of U.S. Pat. No. 3,791,871 and reactions 4 through 6 exemplify the lithium peroxide reactions of the invention. In reactions 5 and 6, $HO_2^-$ represents the peroxide ion which forms when hydrogen peroxide is dissolved in the alkaline electrolyte.

| | | |
|---|---|---|
| Anode | $2 Li \longrightarrow 2 Li^+ + 2e$ | $E° = 3.05V$ (1) |
| Cathode | $2 H_2O + 2e \longrightarrow 2 OH^- + H_2$ | $E° = 0.83V$ (2) |
| Cell | $2 Li + 2 H_2O \longrightarrow 2 Li^+ + 2 OH^- + H_2$ | $E° = 2.22V$ (3) |
| Anode | $2 Li \longrightarrow 2 Li^+ + 2e$ | $E° = 3.05V$ (4) |
| Cathode | $HO_2^- + H_2O + 2e \longrightarrow 3 OH^-$ | $E° = 0.88V$ (5) |

| Cell | | |
|---|---|---|
| | $2Li + HO_2^- + H_2O \longrightarrow 2Li^+ \ 3OH^-$ | $E° = 3.93V$ (6) |

The net result of reaction 6 is the consumption of 2 moles of lithium per mole of peroxide ion with the generation of lithium hydroxide. Whereas it appears that water is also consumed in the process, this is not the case since water is generated by a neutralization reaction:

$$H_2O_2 + OH^- \rightarrow H_2O + HO_2^-$$

The additional voltage and energy potentially available with peroxide is readily apparent from a comparison of reactions 6 and 3. It is generally accepted, however, that voltage much greater than 2V cannot be achieved in aqueous electrolytes because decomposition of water into hydrogen and oxygen gases will occur. In the present invention voltages somewhat greater than 3V have been achieved and it has been possible to harness the large amount of available energy between lithium and peroxide to produce useful electrical work. Elimination of hydrogen gas as a reaction product also has significant advantages from safety considerations, gas separation problems from the electrolyte, and in cell/battery design. Although voltages of 3V or greater have been achieved with lithium in nonaqueous (organic) electrolytes, only rather insignificant amounts of power (product of cell potential in volts and current in amperes yields power in watts) can be generated. This invention yields both high voltage (and therefore high energy density) at high power densities (1.0 W/cm$^2$ achieved vs. 0.01 to 0.03 W/cm$^2$ in nonaqueous electrolytes). Consumption of lithium is also less than in the lithium-water cell because high power densities can be achieved from voltage rather than current.

It has been further unexpectedly determined that hydrogen peroxide, contra to the teachings of the prior art, acts as an anode moderator in reactive metal-water cells and, by enhancing efficiency of the reactive anode, reduces the anode's sensitivity to changes in hydroxyl ion concentration of the electrolyte and changes in electrolyte flow rate and improves the operating temperature characteristics of the cell. In conventional nonconsuming anode-electrochemical cells, hydrogen peroxide does not improve anode efficiency and in some circumstances has been found to degrade anode performance. Conventional fuel cells normally operate on hydrogen as the anode reactant and oxygen or air as the cathode reactant. The anode and cathode compartments are separated by a membrane to prevent the direct chemical combination of the reactants. When peroxide is used as the source of oxygen for the cathode, performance is generally not as good as with oxygen gas and anode performance is degraded because it is easier for the soluble peroxide to diffuse through the membrane and react with hydrogen gas.

BRIEF DESCRIPTION OF THE DRAWING

The invention may be more easily understood from the following description and accompanying drawing in which.

DESCRIPTION OF THE PREFERRED EMBODIMENTS

Results were obtained utilizing an electrochemical cell in accordance with the aforesaid patent. For each run, a lithium anode and a silver cathode were utilized, the electrode area of each being 165 cm$^2$. The electrolyte was lithium hydroxide.

The battery voltage and current were recorded with time on a Varian G-22 Recorder. Individual cell voltages were obtained at 15-minute intervals with a Keithley Model 168 Autoranging Digital Multimeter and gas readings were obtained with a Precision Scientific 3 liter Wet Test Meter. Lithium efficiency was obtained gravimetrically and the average lithium energy density in a test calculated from the weight of lithium consumed. The lithium hydroxide concentration of the electrolyte was controlled automatically with an electronic diluent controller. The controller sensed the cell/battery voltage and actuated a solenoid valve to add diluent water when the voltage fell below a given set-point. The cell/battery load was a carbon pile resistor and current was measured with a Weston Model 931 Multi-range Ammeter. Suitable means were available in the test station for sensing and controlling electrolyte temperature and electrolyte flow rate.

Although silver is the preferred cathode material for peroxide reduction, various other cathode materials disclosed in the aforementioned patent such as iron, black iron, nickel and black nickel are acceptable. Other cathode materials would also include platinum, black platinum, palladium and black palladium. As disclosed in co-pending U.S. patent application Ser. No. 443,905 filed Feb. 19, 1974, the cathode was a screen formed of 12 × 12 mesh steel, 23 mil diameter wire which was spot welded to 0.03-inch steel rib spacers fastened to a steel back plate. The cathode screen was positioned against and separated from the anode by the electrically insulating film formed on the anode in the presence of water.

Figure 1:
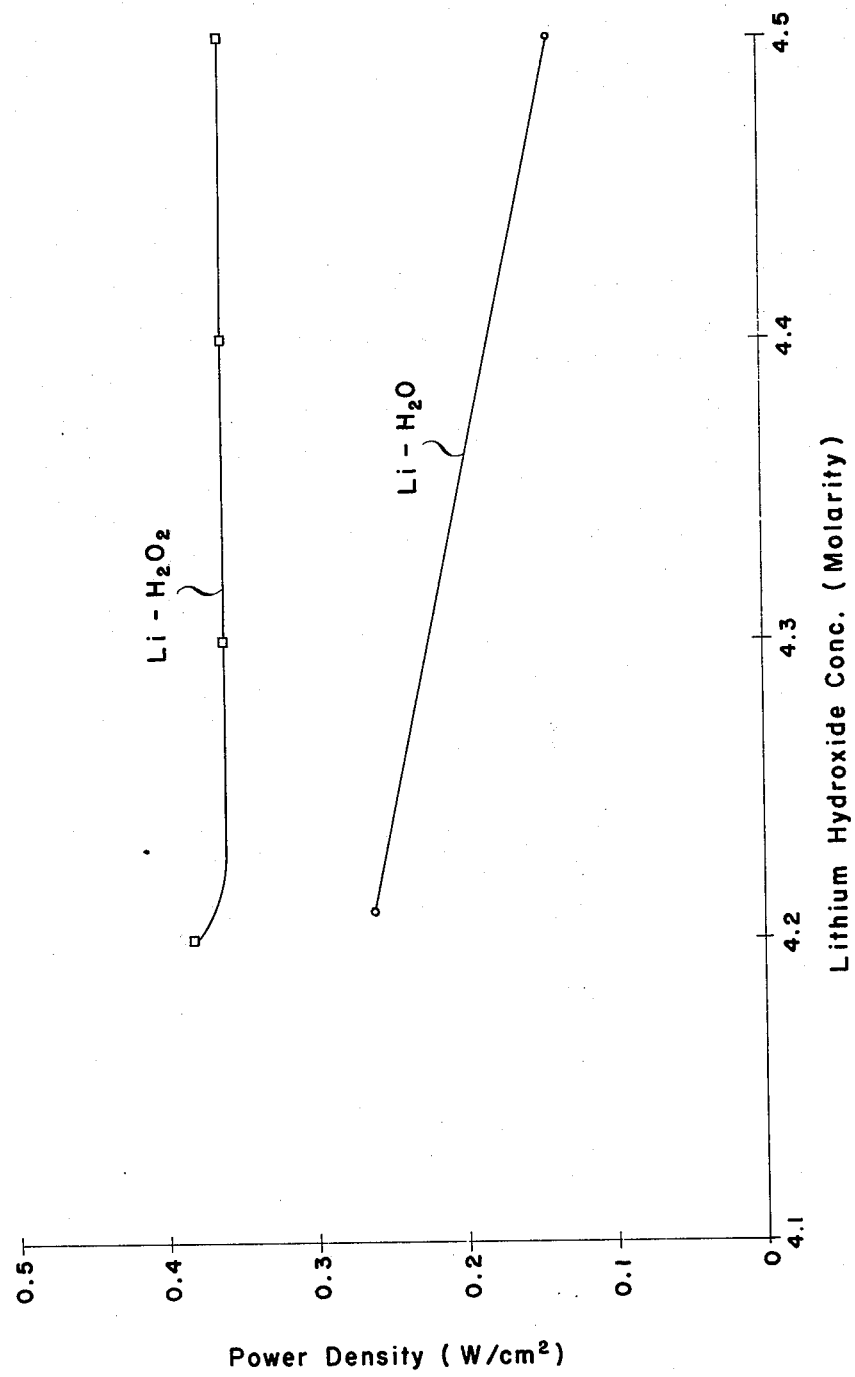
FIG. 1, on coordinates of power density in watts per square centimeter and lithium hydroxide concentration in moles per liter, is a plot comparing performance of a lithium-water cell and a lithium peroxide cell over a range of lithium hydroxide concentrations.

Referring more particularly to FIG. 1, there is depicted the characteristics of a lithium-water cell utilizing a lithium hydroxide electrolyte and a cell with lithium hydroxide and containing 0.25 M hydrogen peroxide. Performance of the cells are depicted at increasing lithium hydroxide molarities. As shown by the power density curves, the power of the peroxide cell remains essentially constant at lithium hydroxide concentrations from 4.25 to 4.50 molar. In contrast, it is shown that without peroxide additions, the power density decreases by some 45% in this molarity range. The lithium hydroxide concentration would have to be maintained at 4.20 ± 0.01 M without peroxide to achieve such constant power density and even then it is at a much lower level.

Figure 2:
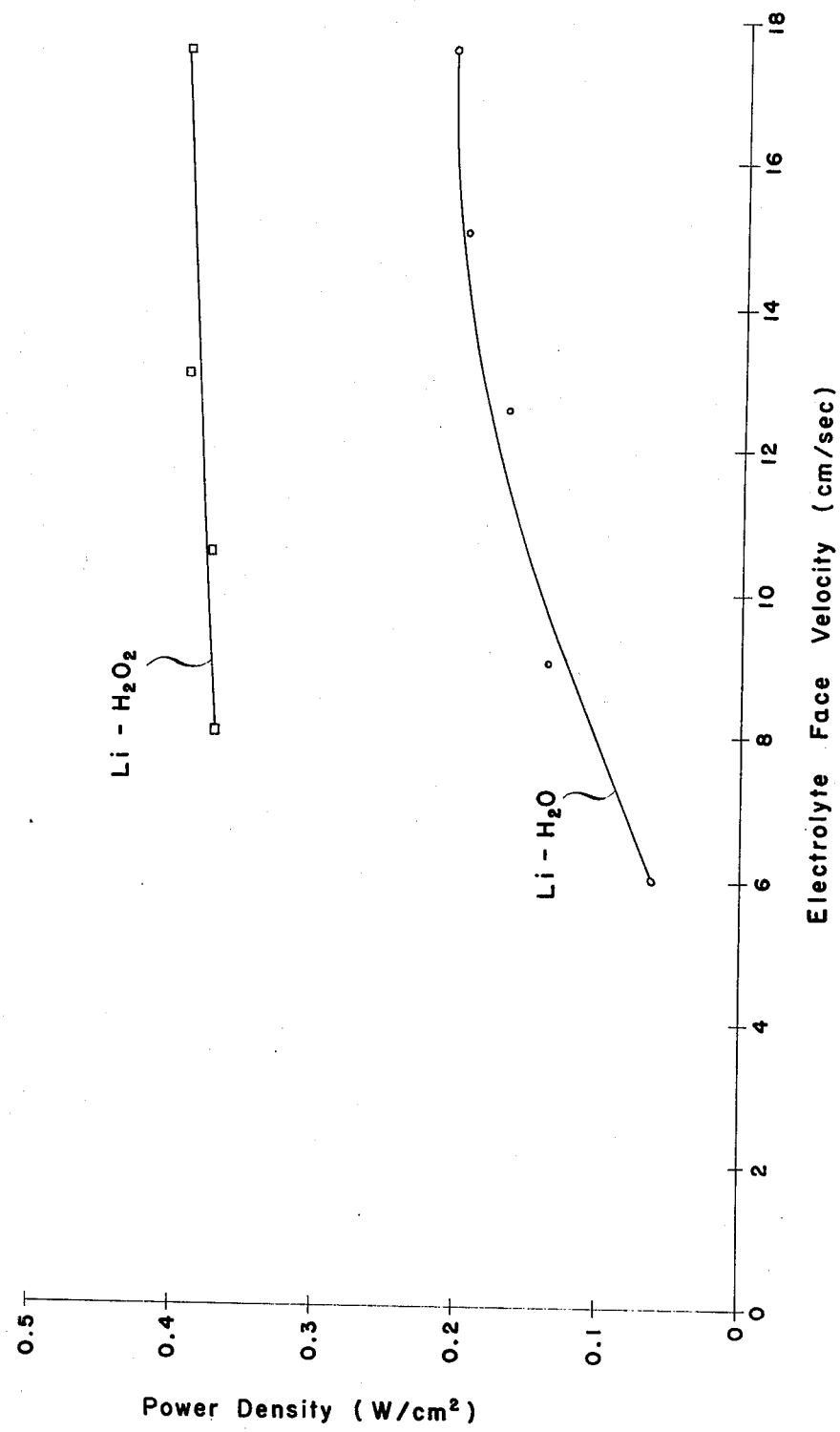
FIG. 2, on coordinates of power density in watts per square centimeter and electrolyte pumping speed in centimeters per second, is a plot comparing performance of a lithium-water cell and a lithium peroxide cell over a range of pumping speeds.

Referring to FIG. 2, there is plotted the results of tests comparing the performance of the lithium-water and lithium peroxide cells at various electrolyte pumping speeds. It is desirable to achieve high power densities at low pumping speeds in order to reduce the power requirements for the pump (represents a power loss from battery). It is also desirable to have power remain constant over a broad range of flow rates. This simplifies multicell battery design because electrolyte flow to individual cells does not need to be perfectly balanced. The power density increases by only 7% in the lithium peroxide cell upon increasing the electrolyte face velocity from 8 to 16 cm/sec (double the electrolyte flow rate). By contrast, a 100% increase in power density in the lithium-water cell is observed by a similar increase in electrolyte face velocity. Quite high power densities can be achieved in the lithium peroxide cell at low electrolyte face velocities because high power is obtained from high voltage rather than high currents.

Figure 3:
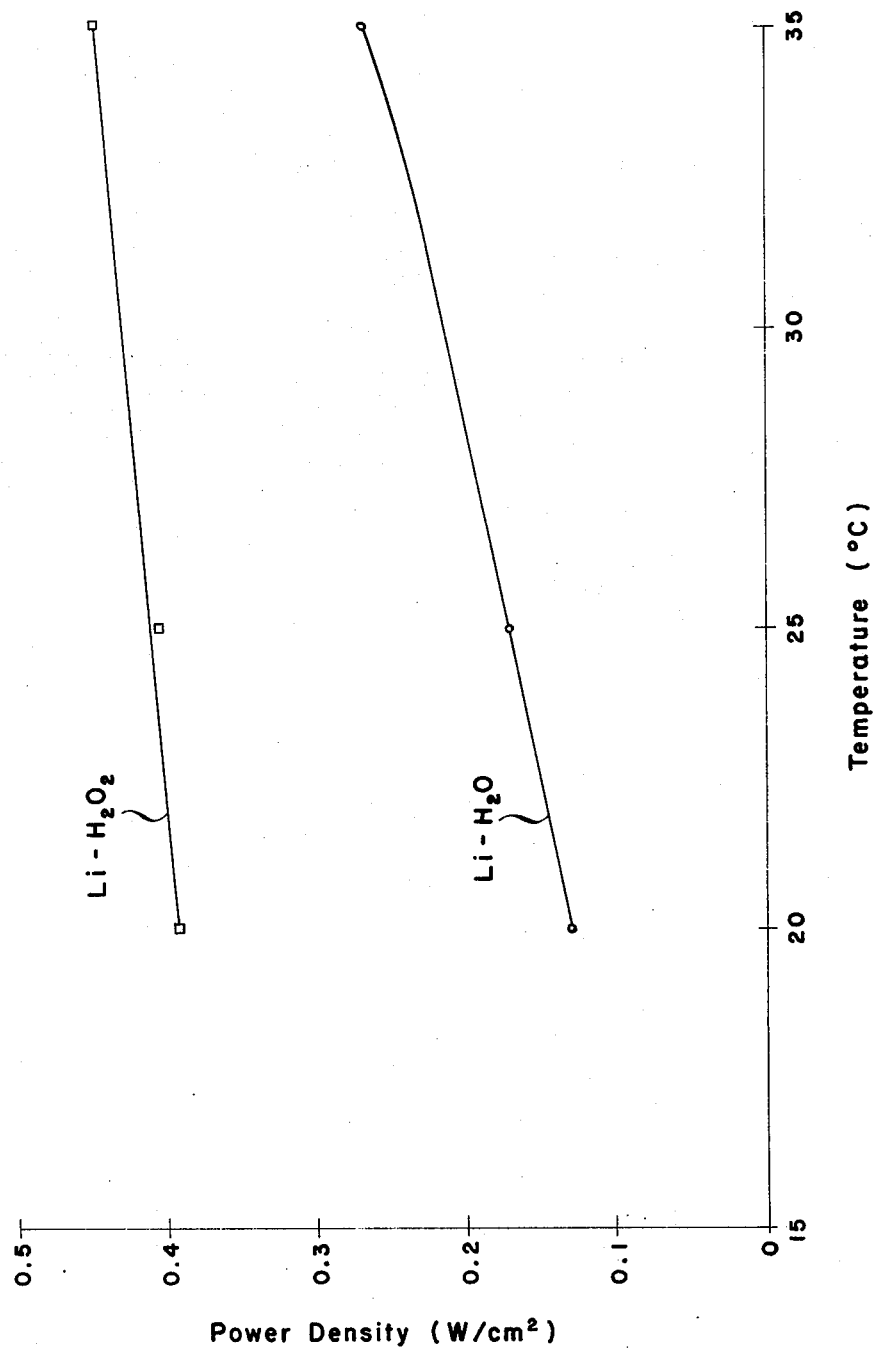
FIG. 3, on coordinates of power density in watts per square centimeter and temperature in degrees centigrade, is a plot comparing performance of a lithium-water cell and a lithium peroxide cell over a range of temperatures.

Referring to FIG. 3, there is plotted the results of tests comparing the performance of the lithium-water and lithium peroxide cells at various temperatures. Both cells exhibit increased power with increasing temperature, but the increase is not as substantial with peroxide, i.e., 14% versus greater than 100% increase in power density with temperature increase from 20° to 35° C. The power increase with temperature is desirable; however, in the case of the lithium-water cell the power increase is achieved at a substantial decrease in lithium energy density and therefore cost of the battery. The lower lithium energy density occurs because the rate of the corrosion lithium-water parasitic reaction also increases substantially with increasing temperature. This does not occur in the lithium peroxie cell because higher molarity lithium hydroxide electrolytes can be used to suppress the corrosion lithium-water parasitic reaction without reducing the power (refer to FIG. 1). It is therefore possible to achieve constant lithium energy density and power density over a broader temperature range with the lithium peroxide cell.

The molarity of the alkaline electrolyte is dictated by the current density requirement of the system and the temperature of operation. Illustratively, low current density and high voltage operation require higher lithium hydroxide concentration, i.e., 4M and above.

Likewise, high temperature system stability requires high molarity. High power, i.e., high current densities, requires more dilute solution. Lithium hydroxide electrolytes, for example, are typically utilized at concentrations from about 1.5 molar up to saturation, 5.3 molar. These rules also apply when operating with hydrogen peroxide. However, the following additional factors hold when working with soluble peroxides. Large quantities of the soluble peroxide if in contact with lithium react directly and spontaneously with the metal. Thus, it is generally preferred to admit only as much as is needed for the electrochemical reaction. The amount admitted then is a function of the current density to be required from the cell. It has been found that for low current densities, 0.05 moles of hydrogen peroxide will sustain about 100 mA/cm² at normal temperatures, i.e., about 25° C. For higher current densities say to 150 mA/cm², 0.1 molar of hydrogen peroxide are required. At 300 mA/cm², 0.25 moles of hydrogen peroxide are required. The maximum amount of peroxide which can be accommodated is established by tests to determine the level at which excessive direct reaction occurs with the alkali metal with production of excess heat and spontaneous decomposition. Hence, sufficient peroxide is utilized to sustain the desired current density of the cell with the maximum amount being dictated by the production of excess heat and spontaneous decomposition, which effects are readily observable. While concentrations of peroxide up to 40 molar are possible, the concentration typically does not have to exceed 1 molar. Typical formulations are given, as follows:

Example 1
LiOH - 4.5 M
$H_2O_2$ - 0.25 M
Temp. - 25° C
} operates at ca. 300 mA/cm² at 2.5V Example 2
LiOH - 5.0 M
$H_2O_2$ - 0.25 M
Temp. - 50° C
} high temperature composition with output similar to Example 1

Example 3
LiOH - 4.0 M
$H_2O_2$ - 0.1 M
Temp. - 20° C
} lower temperature, lower current density combination ca. 150 mA/cm² at 2.5V Example 4
LiOH - 4.0 M
NaCl - 0.5 M
$H_2O_2$ - 0.1 M
Temp. - 20° C
} seawater system ca. 150 mA/cm² at 2.5V Example 5
KOH - 3.0 M
LiOH - 3.0 M
$H_2O_2$ - 0.05 M
Temp. - 20° C
} low current, high efficiency system 100 mA/cm² at 2.5V Example 6
LiCl - 9.0 M
$H_2O_2$ - 0.05 M
Temp. - 20° C
} system giving high current and voltage in the absence of alkali Example 7
LiOH - 4.5 M
$H_2O_2$ - 5 M
Temp. - 20° C
} very high current density system, i.e., 1A/cm² at 2.5V

What is claimed is:

1. An electrochemical cell consisting essentially of a lithium anode spaced from a cathode by an electrically insulating film formed on said anode in the presence of water, an aqueous lithium hydroxide electrolyte in which said anode and cathode are immersed, and an anode moderator for improving the efficiency of said cell by reducing the said anode's sensitivity to changes in electrolyte molarity, flow rate and temperature, said anode moderator consisting essentially of soluble peroxide ions.

2. An electrochemical cell in accordance with claim 1, wherein said soluble peroxide ions are formed from soluble peroxide compounds selected from the group consisting of hydrogen peroxide, sodium peroxide, sodium super oxide, lithium peroxide, potassium peroxide and potassium super oxide.

3. An electrochemical cell in accordance with claim 2, wherein said soluble peroxide compound is hydrogen peroxide.

4. An electrochemical cell in accordance with claim 2, wherein said soluble peroxide compound is sodium peroxide.

5. An electrochemical cell in accordance with claim 2, wherein said soluble peroxide compound is lithium peroxide.

6. An electrochemical cell in accordance with claim 2, wherein said soluble peroxide compound is potassium peroxide.

7. An electrochemical cell in accordance with claim 2, wherein sufficient peroxide ions are utilized to sustain the desired current density of the cell with the maximum amount being dictated by the production of excess heat and spontaneous decomposition of said anode.

* * * * *